(12) United States Patent
Sikora et al.

(10) Patent No.: US 8,019,048 B2
(45) Date of Patent: Sep. 13, 2011

(54) WINDOW ARRANGEMENT ON A PRESSURE PIPE

(75) Inventors: Harald Sikora, Bremen (DE); Ralf Seidel, Morsum (DE)

(73) Assignee: Sikora AG, Bremen (DE)

( * ) Notice: Subject to any disclaimer, the term of this patent is extended or adjusted under 35 U.S.C. 154(b) by 88 days.

(21) Appl. No.: 12/541,541

(22) Filed: Aug. 14, 2009

(65) Prior Publication Data

US 2010/0046714 A1 Feb. 25, 2010

(30) Foreign Application Priority Data

Aug. 21, 2008 (DE) .................. 10 2008 039 024

(51) Int. Cl.
*G21K 1/00* (2006.01)
*G01N 23/06* (2006.01)
*G01N 23/20* (2006.01)

(52) U.S. Cl. .............. 378/161; 378/53; 378/54; 378/80; 378/83; 378/88; 378/89; 378/90

(58) Field of Classification Search .............. 378/53, 378/54, 80, 83, 88–90, 161
See application file for complete search history.

(56) References Cited

U.S. PATENT DOCUMENTS

| | | | | |
|---|---|---|---|---|
| 3,056,026 A | * | 9/1962 | Bigelow | 378/56 |
| 3,144,559 A | * | 8/1964 | Forrester et al. | 250/384 |
| 3,246,145 A | * | 4/1966 | Higgins | 250/383 |
| 3,246,146 A | * | 4/1966 | Cohen et al. | 250/310 |
| 3,396,272 A | * | 8/1968 | Olson | 378/53 |
| 3,508,047 A | * | 4/1970 | Mott et al. | 250/252.1 |
| 3,529,153 A | * | 9/1970 | Wilson et al. | 378/56 |
| 4,429,410 A | * | 1/1984 | Jury et al. | 378/53 |
| 5,005,194 A | * | 4/1991 | Fritz et al. | 378/53 |
| 6,335,959 B1 | * | 1/2002 | Lynch et al. | 378/45 |

\* cited by examiner

*Primary Examiner* — Edward Glick
*Assistant Examiner* — Thomas R Artman
(74) *Attorney, Agent, or Firm* — Vidas, Arrett & Steinkraus P.A.

(57) ABSTRACT

A window arrangement on a pressure pipe, with a casing in the train or at the end of the pressure pipe, said casing featuring flanges on diametrically opposing sides having radially directed passages, whose axes are standing perpendicular to the longitudinal axis of the pressure pipe and are located in a measurement plane for an x-ray measurement device, an x-ray source being associated to the one passage on the outer side and a receiver sensitive to X-rays to the other passage, and with window plates that are transmissive for X-rays which are sealingly arranged in the associated passage and are fixed in the passage with the aid of a fastening member and which consist of a material which is resistant against high temperatures and process-due etchings by chemically aggressive substances.

19 Claims, 4 Drawing Sheets

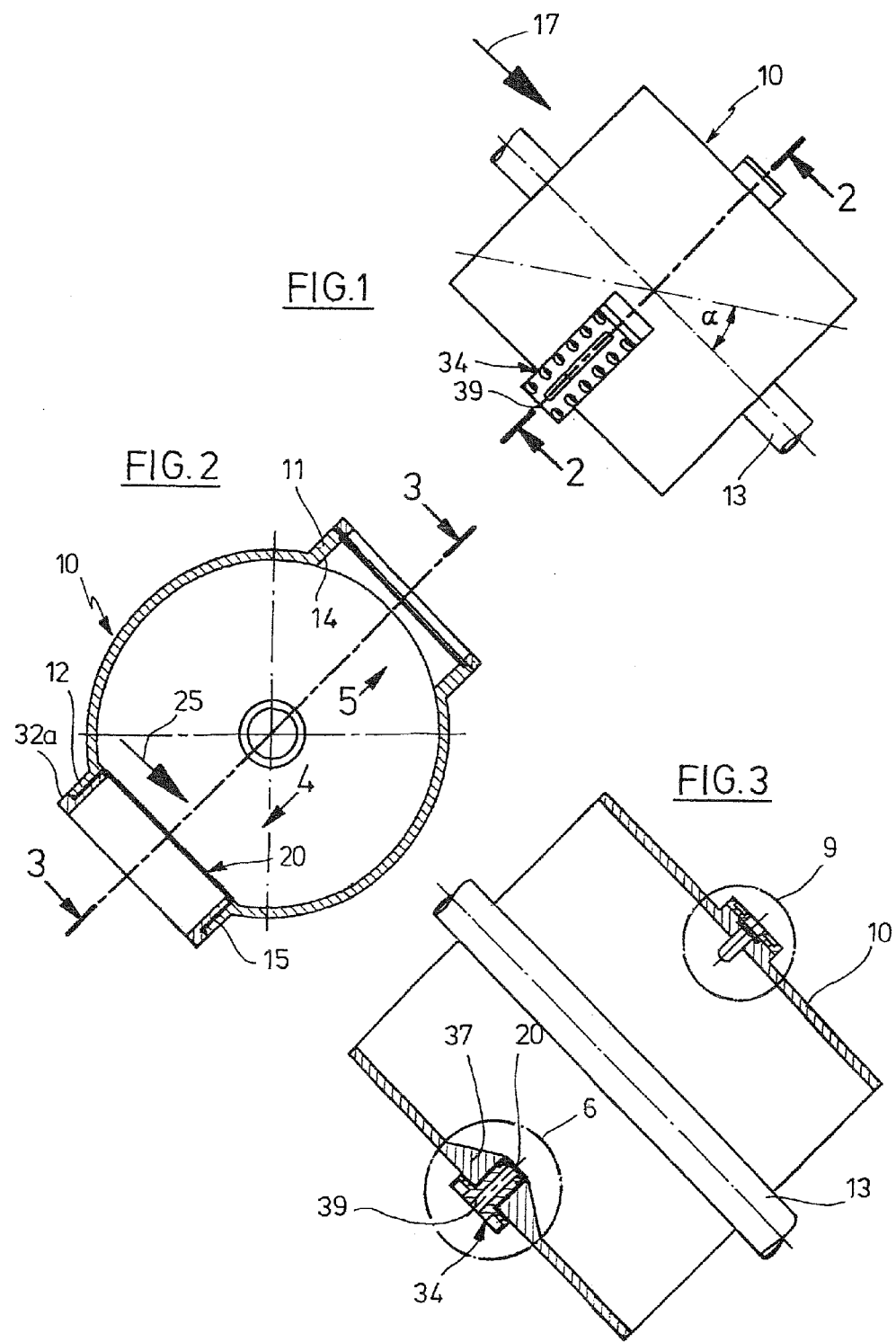

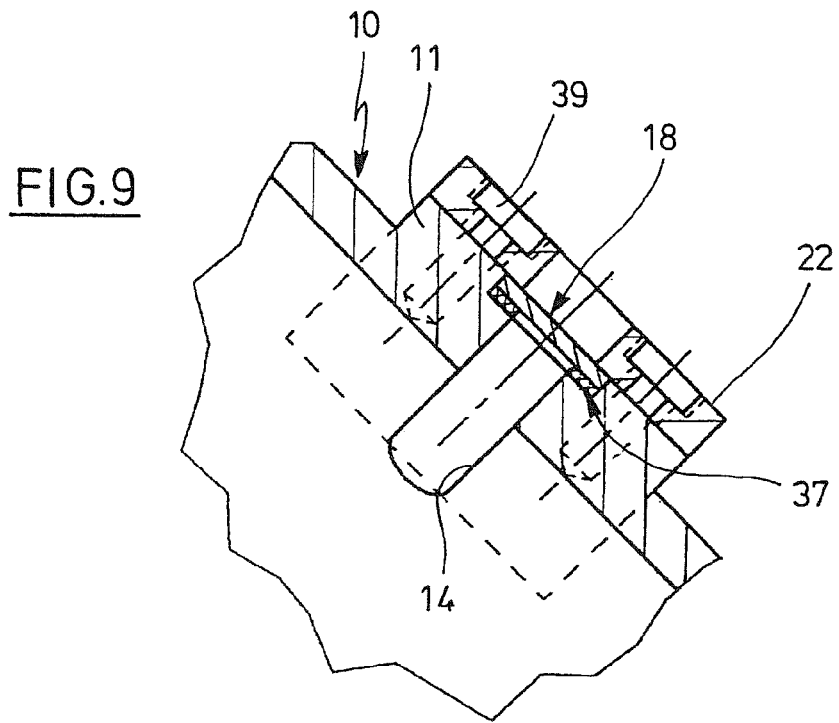
FIG.9
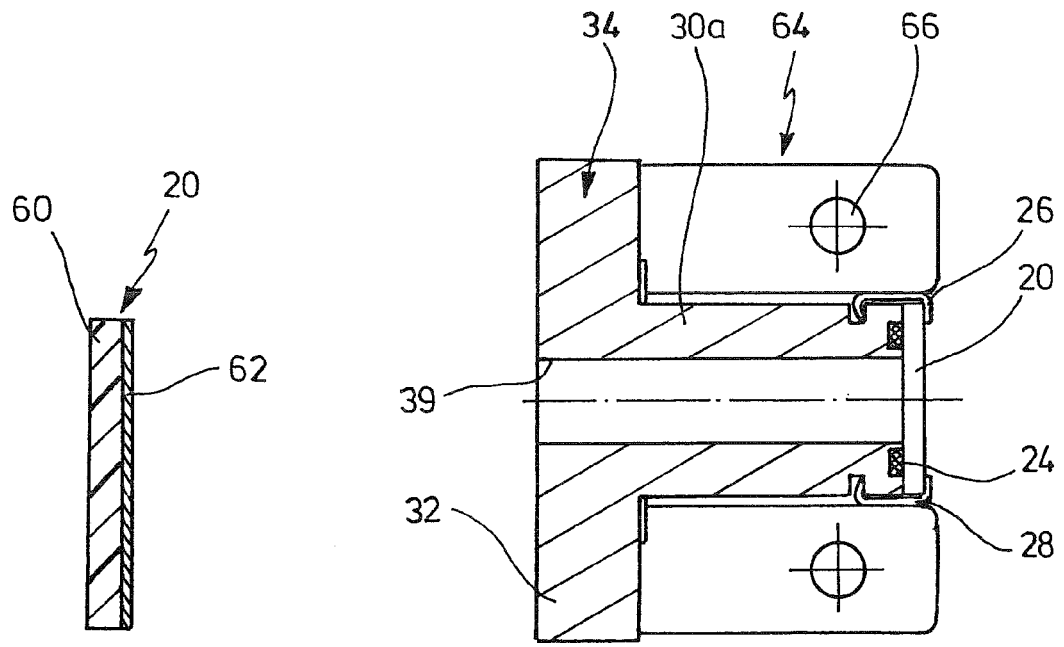
FIG.10
FIG.11

WINDOW ARRANGEMENT ON A PRESSURE PIPE

CROSS-REFERENCE TO RELATED APPLICATIONS

Not applicable

STATEMENT REGARDING FEDERALLY SPONSORED RESEARCH

Not applicable

BACKGROUND OF THE INVENTION

The present invention is related to a window arrangement on a pressure pipe, preferably for the vulcanisation or crosslinking of sheathings of electric cables.

In the manufacture of cables, the cable sheathing is extruded on the cable core with the aid of an extruder. By crosslinking the cable coating consisting of plastic material, the plastic mass is made elastic. The crosslinking or vulcanisation, respectively, of the plastic material takes place in a pressure pipe, in which there are relatively high temperatures and a significant overpressure, for instance temperatures up to 550° C. and pressures up to 30 bars.

It is known to determine the diameter of cable sheathing and/or the thickness of individual layers of the cable sheathing with the aid of an x-ray measurement device. The x-ray measurement device features an x-ray radiation source and an x-ray sensitive receiver. The latter is for instance made up of individual x-ray sensitive elements, which are sensed in series.

When a determination of wall thickness and/or diameter of a cable is to be performed during its passage through the pressure pipe, the x-ray measurement device must be arranged in the train of the pressure pipe. It is known to use separate casings for this, which are aligned to diametrically opposing passages in the pressure pipe, through which the measurement plane of the x-ray measurement device extends perpendicularly to the longitudinal axis of the pressure pipe. The passages are sealingly closed by a window plate, which is easily transmissive for x-rays.

It is known to provide thin window plates made of beryllium. Of the metals, beryllium has the lowest absorption of x-rays, at equal values of strength. The beryllium plates are fixed against a shoulder in the passage together with a flat seal, namely by a projection of a so-called T-flange, which is fastened on the casing on the outside by screwing. The beryllium plate is pressed against a passage shoulder via the seal under high pressure with the aid of the T-flange.

Beryllium is considered to be highly toxic, and beryllium dust is carcinogenic.

For this reason and in order to improve the corrosion resistance of the beryllium plates, the same are overlaid with a ceramic layer for instance. During the operation in the pressure pipe, condensate accumulates in the lower region of the beryllium window, and together with sulphur- and chlorine containing components it causes corrosion of the beryllium. Carcinogenic beryllium particles can reach the operation control region when beryllium plates become permeable by corrosion pressure and are ejected into the atmosphere through this. Ceramic and also metal coatings of the beryllium plate in order to avoid corrosion have proven to be effective only in a limited extent, because of too small layer thicknesses.

It is also known to arrange a protective foil before the beryllium plate for protection purposes. Like a coating, the same can be damaged when solid residues which had been precipitated on the beryllium foil are being removed.

Finally, in the conventional arrangement of beryllium plates a sumptuous examination of the placement of the seals is necessary after the installation, in particular in order to avoid a leakage, because in such cases beryllium particles could arrive in the air of the surroundings.

The present invention is based on the objective to provide a window arrangement on a pressure pipe, preferably for the vulcanisation or crosslinking of sheathings of electric cables, which is less prone to corrosion and permits a drain-off of the condensate.

BRIEF SUMMARY OF THE INVENTION

The present invention provides for condensation of the gas atmosphere on the window plate. The latter is arranged such that the condensate can drain off without hindrance and drags dirt particles along in doing so. The condensate loaded with dirt flows into the pressure pipe. This self-cleaning effect reduces the corrosion of the window plate and increases its operation life.

In the window arrangement of the present invention, the window plate is preferably formed of a ceramic material. Ceramic material is corrosion resistant, as is commonly known. Moreover, ceramic material is physiologically unobjectionable. An additional coating as a corrosion protection is not necessary. Solid deposits can be easily removed from a window plate made of ceramics without impairing the window plate in its function.

In fact, ceramics has lower transmission ability for x-rays than beryllium;

however, the higher attenuation can be compensated by increasing the x-ray current or the x-ray energy.

Alternatively, titanium, carbon fibre reinforced plastics, or a combination of these materials can also be used. Particularly preferred is PEEK (polyetheretherketone). Plastics tolerate relatively high temperatures, for instance 250° C., but are then no longer pressure resistant. One embodiment according to the present invention therefore provides to coat the plastics on the inner side with a metal foil, preferably titanium foil.

By the coating, an improved heat dissipation, a reflection of the heat radiation from the hot protective gas (up to 400° C.), and due to the bright surface, a self-cleaning ability are achieved. Because of its smooth surface, the window allows easier cleaning. The window of the present invention is non-toxic, mechanically stable and chemically resistant. The cited properties lead to a longer operating lifetime.

According to one embodiment of the present invention, the window plate bears against a ring seal on the pressureless side, against an O-ring for instance. The mounting of the window plate can be such that the same bears against the seal with a certain bias. With increasing pressure in the pressure pipe, the window plate is pressed more strongly against the sealing ring. This measure permits a more uniform distribution of the forces which act on the window plate and the seal. A window plate made of a brittle material, like ceramics e.g., is therefore not inadmissibly loaded.

According to another embodiment of the present invention, the window plate is held by lateral holder elements, which can be formed by longitudinal clamps according to a further embodiment of the invention, which on their part are fixed by the side walls of the passage or of the pressure pipe, respectively. The clamps are preferably U-shaped and bear against the pressure pipe side of the window plate with one leg, and with the other leg they engage into a recess that is stationary with respect to the pressure pipe, in order to effect the fixation of the window plate. In this, the legs extend approximately over the length of the window plate and cover a part of its area. However, the portion of the area located between the legs is sufficiently large to permit the passage of x-rays.

Moreover, the mounting of the window plate is such that condensate draining off on the window plate can flow back into the pressure pipe, bypassing the holder element in the region thereof without accumulating on a certain spot and impairing the window plate.

In order to reduce the impairment of the window by heat, in the region of the lower window in particular, and to facilitate the condensation in particular, one embodiment of the present invention provides that at least one cooling channel for the flow of a cooling agent is associated to the window arrangement, for instance of water. When a so-called T-flange is used against which the window plate bears, it is advantageous to surround the flange by an annular body in which a cooling channel is formed.

BRIEF DESCRIPTION OF THE SEVERAL VIEWS OF THE DRAWINGS

An example of the realisation of the present invention is explained in more detail in the following by means of drawings.

FIG. 1 shows a portion of a pressure pipe for the production of electric cables with a window arrangement according to the present invention;

FIG. 2 shows a section through the arrangement after FIG. 1 along the line 2-2;

FIG. 3 shows a section through the arrangement after FIG. 2 along the line 3-3;

FIG. 9 shows the detail 9 after FIG. 3 in a magnified view;

FIG. 10 shows a section through a window plate for the shown window arrangements; and FIG. 11 shows a section through a modified embodiment of a lower window arrangement.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

In the figures, a portion 10 of a pressure pipe is shown, for instance for crosslinking sheathings of electric cables 13. However, the pressure pipe portion 10 can also be provided as an independent portion, which is welded into the train of the relatively long pressure pipe.

Figure 6:
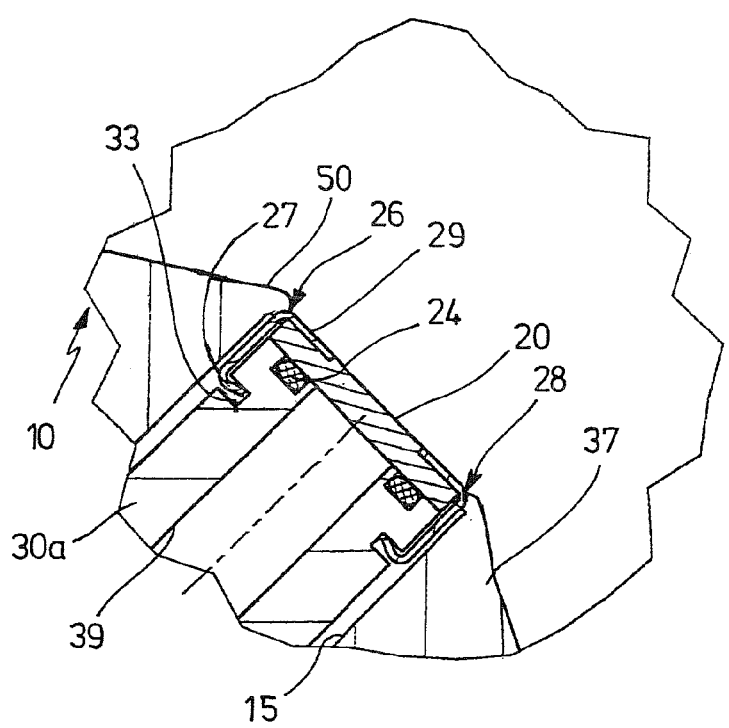
FIG. 6 shows a part of the detail 6 after FIG. 3 in a magnified view.
Figure 7:
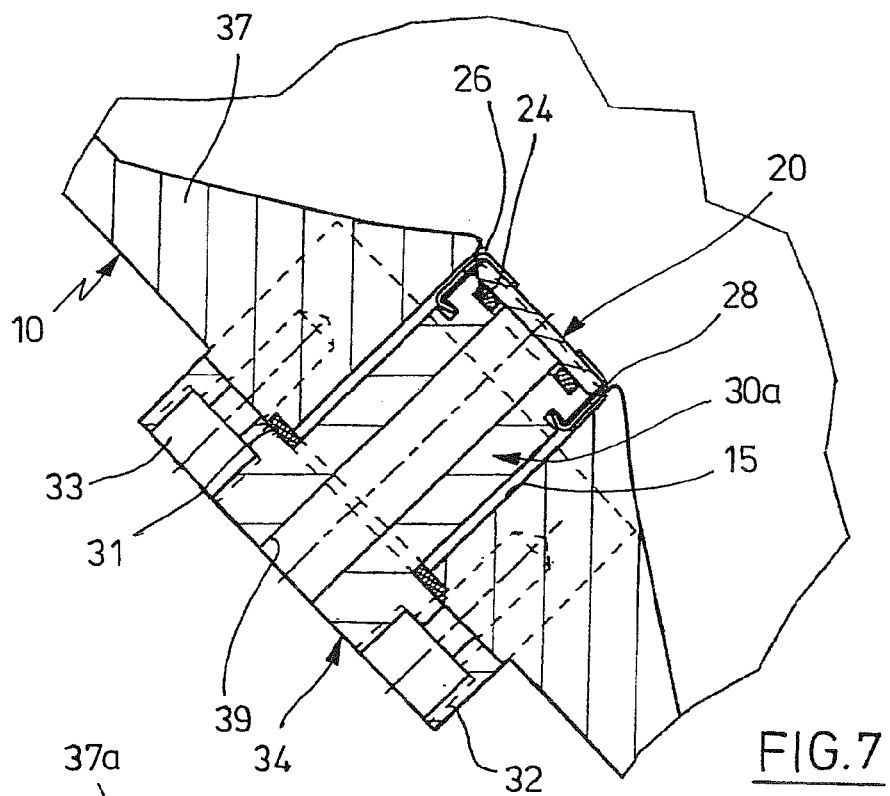
FIG. 7 shows the detail 6 after FIG. 3 in a magnified view.

The pressure pipe portion 10 has diametrically opposing flanges 11 and 12, radially directed towards the outside, which form a passage 14 or 15, respectively, approximately slit-shaped in cross section. The shaping of the flanges 11, 12 and the further parts, respectively, that are associated to the passages 14 and 15, respectively, emerge more clearly from the FIGS. 6 and 7. In FIG. 7, a flange body 34 can be recognised with an outer flange 32, which is screwed against the wall of the pressure pipe portion 10 at the outside, with the aid of screws 33. As can be recognised in FIG. 3 in particular, the pressure pipe portion 10 is reinforced towards the inside in this region by a thickening 37. When "inside" and "outside" are mentioned above and below, this refers to the pressure pipe, i.e. to its interior or exterior, respectively. The flange body 34 features a sleeve portion 30a, which is introduced into the passage 15. The perimeter of the sleeve portion 30, which is longitudinal perpendicularly to the drawing plane, is shaped corresponding to the cross section of the passage 15 and longitudinal, wherein a gap is left free between the outer side of the sleeve portion 30a and the wall of the passage 15. A seal 31 is inserted between the flange 32 and the outer side of the pressure pipe 10.

The flange 32 with sleeve portion 30a forms a continuous passage 39 with a slit-shaped cross section.

A window plate 20 made of ceramics or plastics is laid against the free end of the sleeve portion 30a. In an annular recess on the front side of the sleeve portion 30a is embedded an O-ring 24, which projects somewhat over the front side of the sleeve portion 30a in its released condition. The window plate 20 is pressed against the free end of the sleeve portion 30a with the aid of two longitudinal clamps 26, 28 having a U-shaped cross section, and is held in place on it by doing so, the O-ring 24 being set under a small bias. The one inner leg 29 of the clamps 26, 28 is sunk in a corresponding recess of the window plate 20 in FIG. 6. Therefore, the leg 29 is flush with the outer side of the window plate 20, which faces the interior of the pressure pipe 10. The other leg 27 engages into a recess 33 at the outer side of the sleeve portion 30a, in order to fix the window plate 20. The leg 27 is somewhat bent in the direction of the other leg 29, in order to generate a torque in the direction towards the window plate 20. The bridge of the U-clamps 26, 28 extends in the gap between the wall of the passage 15 and the outer side of the sleeve portion 30a.

Condensate being formed in the pressure pipe 10 can drain off, as indicated in FIG. 1 by the arrow 17. The pressure pipe has a down-grade α (FIG. 1). Besides to that, it flows according to the arrow 25 in FIG. 2. This is caused by the skew arrangement of the window plate 20 (FIG. 2 or 6). Therefore, it can be recognised in FIGS. 6 and 7 that condensate depositing on the window plate 20 can drain off from left to right, without being prevented from doing so by measures for fastening the window plate 20. The condensate flows back directly into the interior of the pressure pipe 10.

The arrangement of the window plate 20 can be such that the temperatures always remain below the dew point of the gas atmosphere in the pressure pipe 10. However, it is also conceivable to provide suitable cooling measures, so that the temperature of a window plate 20 is always below the dew point.

Figure 4:
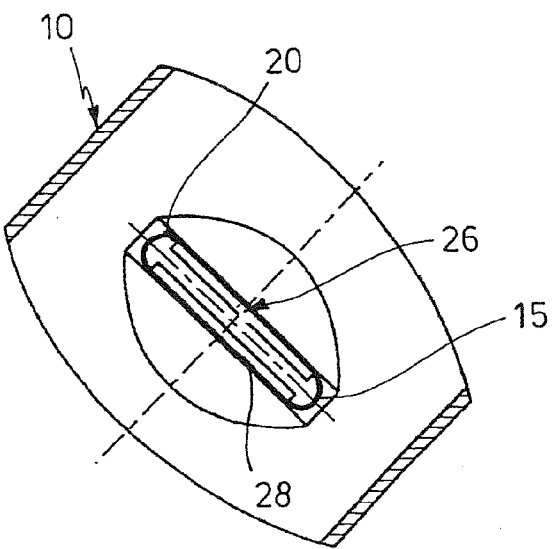
FIG. 4 shows a view according to the arrow 4 of the depiction after FIG. 2.
Figure 5:
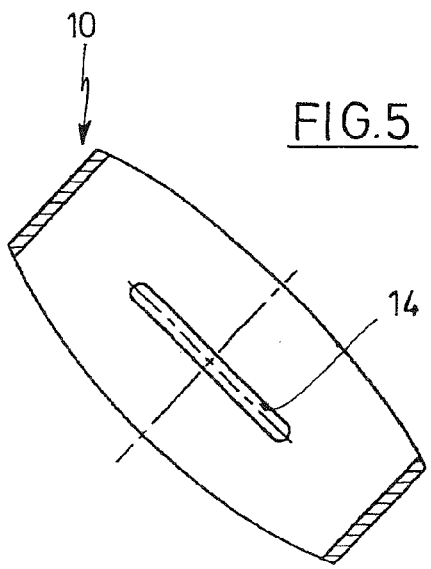
FIG. 5 shows the view 5 of the depiction after FIG. 2.

In FIG. 4, the shape of the window plate 20 and the extension of the legs 29 of the springs 26, 28 can be clearly recognised. The springs are formed from a suitable flat material. The legs 29 extend over a great part of the length of the window plate 20, but have a sufficient distance between them to permit the passage of x-rays. With respect to this, it has to be mentioned that suitable measures for the through irradiation of the interior of the pressure pipe 10 with an x-ray beam, and for receiving the x-ray beam by a suitable x-ray receiver (not shown) are associated to the flanges 11, 12. This x-ray arrangement serves for measuring the sheathing of electric cables which are crosslinked in the pressure pipe, as is per se known. However, this is not depicted in detail.

The detail 9 after FIG. 3 is depicted in FIG. 9. One recognises a window plate 18 according to the state of the art, which is set into a recess of the flange 11, a seal or a sealing ring 37 being interconnected there between. The window plate 18 is pressed against the flange 11 with the aid of a flange 22. The flange 22 is screwed onto the flange 11 with the aid of screws 39. However, the window plate can also consist of plastic material, of PEEK for instance, which is coated with a titanium foil in order to achieve the advantages mentioned above.

In FIG. 6, the thickening 37 on that side of the passage 15 that is at the front side in the production direction features a portion 50, which projects farther into the pressure pipe 10 than the window plate 20. In case that a cable slacks downward, it is prevented from coming into contact with the window plate 20 by this. The window plate 20 is in addition protected by the clamps 26, 28 in FIG. 7.

Figure 8:
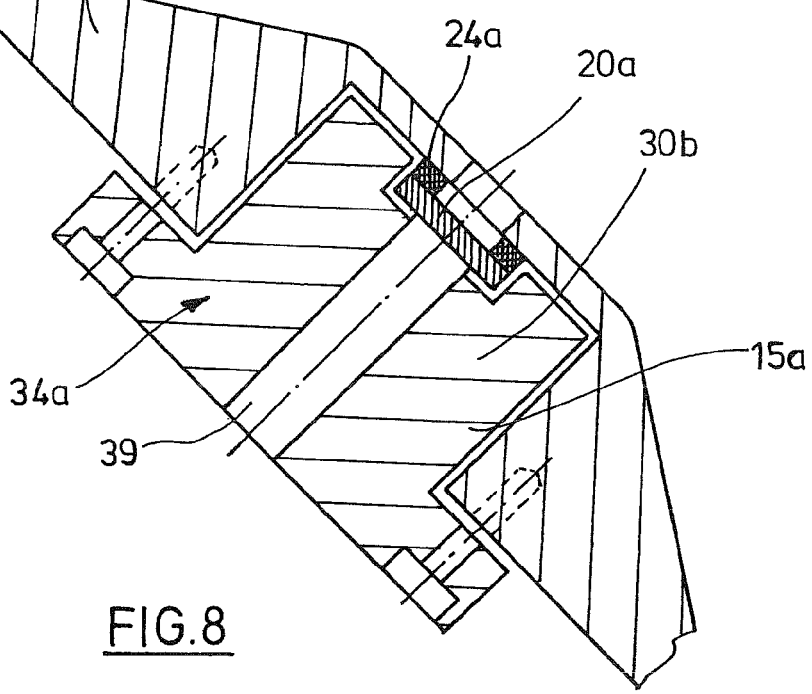
FIG. 8 shows a section similar to FIG. 6 or 7, but according to the state of the art.

FIG. 8 shows a lower window arrangement in the position of FIG. 2 according to the state of the art, with a flange body 34*a*, which receives a window plate from beryllium in a recess located in the interior, which is pressed against the shoulder and the passage 15*a* by way of a seal 24*a*.

The window plate 20 is shown in a section in FIG. 10. It consists of a longitudinal plate 60 from plastics, PEEK in particular, which is coated with a titanium foil 62 on the inner side. The titanium foil 62 faces the interior of the window plate; therefore it effects a dissipation of heat as well as a reflexion of the heat radiation which is caused by the protective gas in the pressure pipe. The bright surface of the titanium foil 62 permits a self-cleaning effect, and moreover it can be cleaned easily. A window plate as depicted in FIG. 10 can also be used for the upper window arrangement, like that depicted in FIGS. 2 and 3 or 9, respectively.

In FIG. 11, the sleeve-shaped portion of the flange body 34 is surrounded by one of the ring bodies 64, which is connected to the pressure pipe in a suitable way (not shown). The ring body 64 projects somewhat over the window plate 20 towards the inside, as can be clearly recognised in FIG. 11. By this, it provides a protection against a collision of a cable with the window 20.

The ring body 64 is provided with a cooling channel 66, through which water can flow as a cooling agent.

This completes the description of the preferred and alternate embodiments of the invention. Those skilled in the art may recognize other equivalents to the specific embodiment described herein which equivalents are intended to be encompassed by the claims attached hereto.

What is claimed is:

1. A window arrangement on a pressure pipe for vulcanising or crosslinking of sheathings of electric cables, with a casing along or at the end of the pressure pipe, said casing featuring flanges on diametrically opposing sides having radially directed passages, wherein the axes of the passages are perpendicular to the longitudinal axis of the pressure pipe and are in a measurement plane for an x-ray measurement device, an x-ray source being associated to the one passage on the outer side and a receiver sensitive to X-rays to the other passage, and with upper and lower window plates that are transmissive for X-rays which are sealingly arranged in one of the passages, respectively, and are fixed in the respective passage with the aid of fastening means and which consist of a temperature-resistant material which is also resistant against etchings by chemically aggressive substances, wherein the arrangement of at least the lower window plate (20) and a temperature control of at least the lower window plate (20) are realised such that the temperature of at least the lower window plate (20) is below the dew point of the gas atmosphere in the pressure pipe (10), wherein at least the lower window plate (20) is arranged in a skewed manner, and wherein the fastening means are arranged such that they do not prevent condensate from draining off at least the lower window plate (20) into the pressure pipe (10).

2. A window arrangement according to claim 1, wherein the material of at least the lower window plate (20) consists of titanium, ceramics, plastic material, carbon fibre reinforced plastics, PEEK or of a combination of these materials.

3. A window arrangement according to claim 1, wherein at least the lower window plate (20) bears against a ring seal (24) on the side facing away from the pressure pipe.

4. A window arrangement according to claim 3, wherein at least the lower window plate (20) bears against the ring seal (24) under bias.

5. A window arrangement according to claim 1, wherein at least the lower window plate (20) is held by two lateral holder elements.

6. A window arrangement according to claim 5, wherein the lateral holder elements are formed by longitudinal clamps (26, 28), which are fixed by the side walls of the passage (15) of at least the lower window plate (20) or on the pipe (10), respectively.

7. A window arrangement according to claim 6, wherein U-shaped clamps (26, 28) are arranged at opposing sides of at least the lower window plate (20), whose one leg (29) laps over at least the lower window plate (20), and whose other leg engages into a recess (33).

8. A window arrangement according to claim 7, wherein at least the lower window plate (20) or the part of the clamp (26, 28) seizing at least the lower window plate (20), respectively, is situated offset towards the outside with respect to the end of the passage of at least the lower window plate (20) at the side of the pressure pipe.

9. A window arrangement according to claim 6, wherein at least the lower window plate (20) has recesses at the pressure pipe side, which receive the corresponding legs (29) of the clamps (26, 28).

10. A window arrangement according to claim 5, wherein the passage of at least the lower window plate (20) is formed in an interior thickening (37) of the pressure pipe (10), and a portion (50) of the thickening (37) near to the passage (15) of at least the lower window plate (20) protrudes over the lower window plate (20) towards the inside.

11. A window arrangement according to claim 1, wherein at least the lower window plate is held by a lower holder element which features a passage for liquid.

12. A window arrangement according to claim 1, wherein a flange body (34) is formed in the passage (15) of at least the lower window plate (20), which is fixed on the pressure pipe (10) at the outside, and at least the lower window plate (20) is arranged and held on the portion of the flange body located in the interior.

13. A window arrangement according to claim 12, wherein at least the lower window plate bears against the free end of the flange body (34) and the clamps (26, 28) are fixed on the outer side of the flange body (34).

14. A window arrangement according to claim 12, wherein in that a longitudinal ring body (64) is arranged in the passage, wherein the longitudinal ring body (64) surrounds the portion (30*a*) of the flange body (34) which is located in the interior.

15. A window arrangement according to claim 14, wherein a cooling channel (66) is provided in the ring body (64).

16. A window arrangement according to claim 1, wherein the window arrangement comprises at least one cooling channel (66) for the flow of a cooling agent.

17. A window arrangement according to claim 1, wherein at least one window plate made of plastics is coated with a metal foil on the inner side.

18. A window arrangement according to claim 17, wherein a titanium foil (62) is provided.

19. A window arrangement on a pressure pipe-for vulcanising or crosslinking of sheathings of electric cables, with a casing along or at the end of the pressure pipe, said casing featuring flanges on diametrically opposing sides having radially directed passages, wherein the axes of the passages are perpendicular to the longitudinal axis of the pressure pipe and are in a measurement plane for an x-ray measurement device, an xray source being associated to the one passage on the outer side and a receiver sensitive to X-rays to the other passage, and with upper and lower window plates that are transmissive for X-rays which are sealingly arranged in one of the passages, respectively, and are fixed in the respective passage with the aid of fastening means and which consist of a temperature-resistant material which is also resistant against etchings by chemically aggressive substances, wherein the arrangement of at least the lower window plate (20) and a temperature control of at least the lower window plate (20) are realised such that the temperature of at least the lower window plate (20) is below the dew point of the gas atmosphere in the pressure pipe (10), wherein at least the lower window plate (20) is arranged in a skewed manner, and wherein the fastening means are arranged such that they do not prevent condensate from draining off at least the lower window plate (20) into the pressure pipe (10), wherein at least the lower window plate (20) is held by two lateral holder elements, wherein the lateral holder elements are formed by longitudinal clamps (26, 28), which are fixed by the side walls of the passage (15) of at least the lower window plate (20) or on the pipe (10), respectively, and, wherein at least the lower window plate (20) has recesses at the pressure pipe side, which receive the corresponding legs (29) of the clamps (26, 28).

\* \* \* \* \*